E. G. CORWIN.
PROCESS OF MAKING THERMAL BOXES.
APPLICATION FILED FEB. 21, 1917.
1,253,007.
Patented Jan. 8, 1918.
6 SHEETS—SHEET 1.
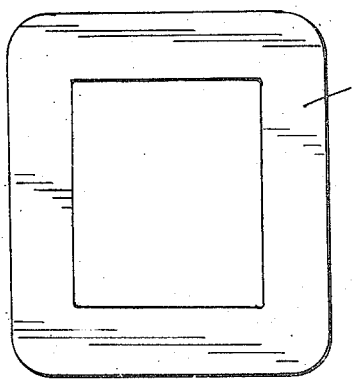
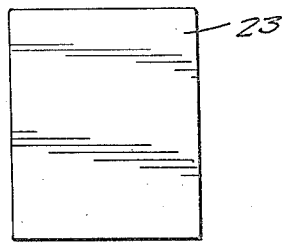
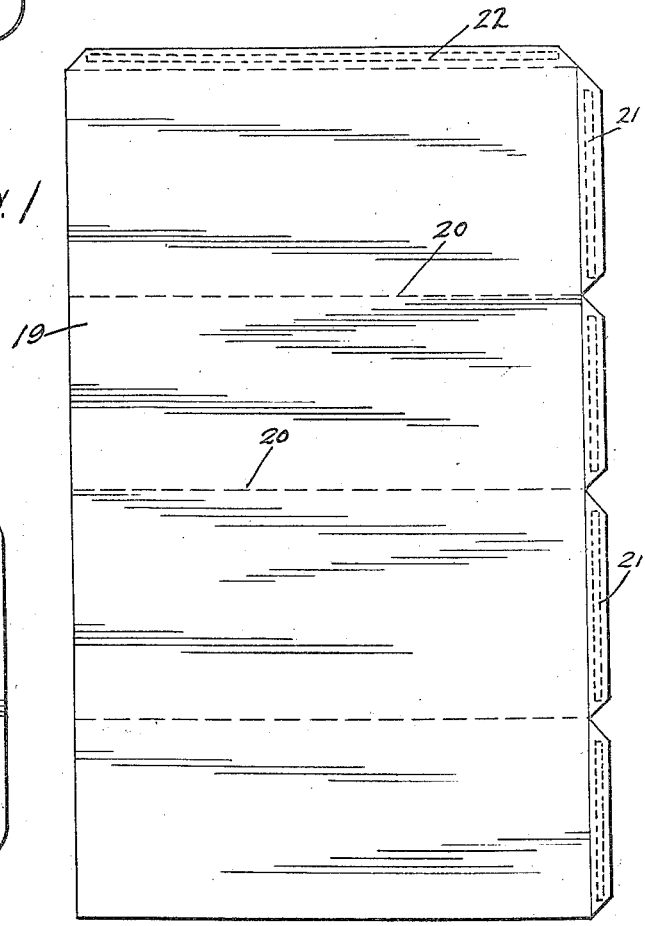
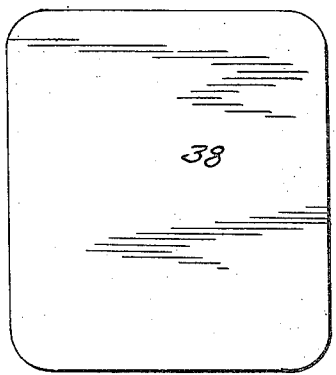
WITNESSES
E. C. Wells
H. L. Opsahl.
INVENTOR
Elmer G. Corwin
BY HIS ATTORNEYS
Williamson Merchant

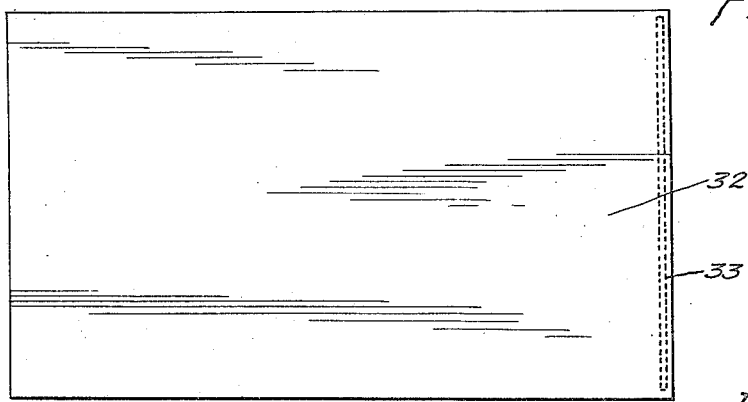
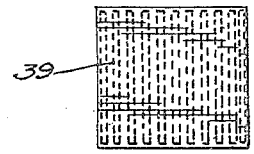
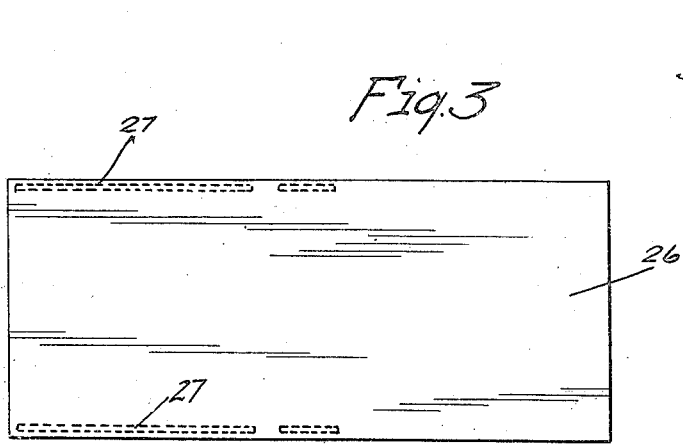
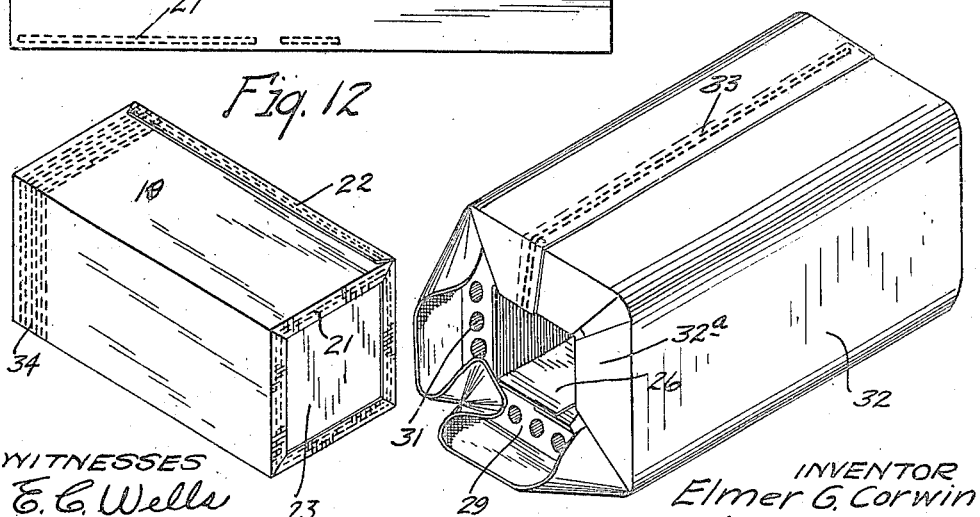

E. G. CORWIN.
PROCESS OF MAKING THERMAL BOXES.
APPLICATION FILED FEB. 21, 1917.
1,253,007.
Patented Jan. 8, 1918.
6 SHEETS—SHEET 3.
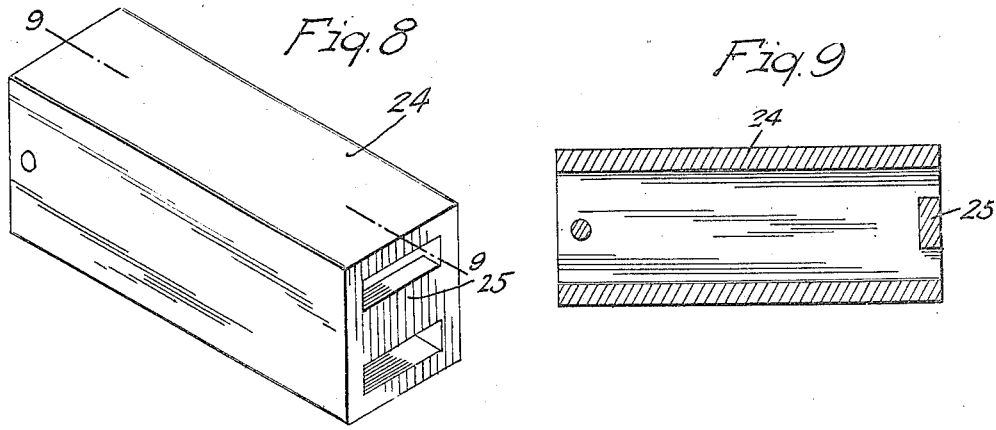
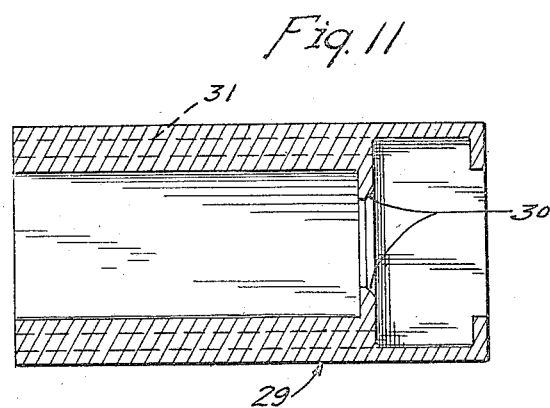
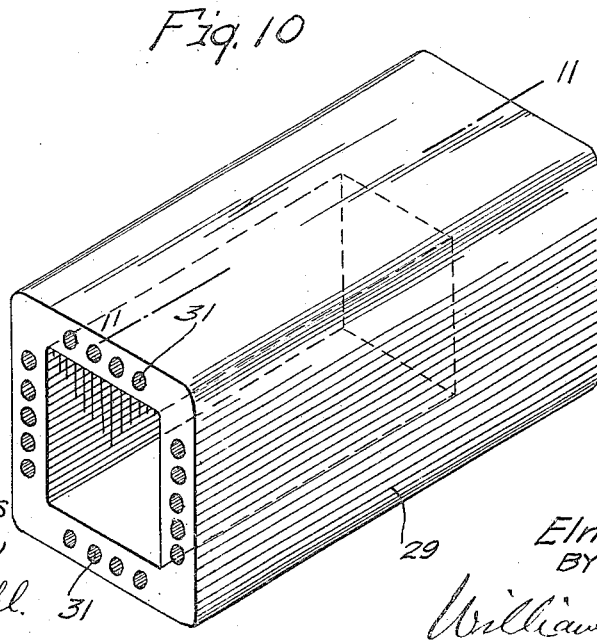
WITNESSES
E. G. Wells
H. L. Opsahl
INVENTOR
Elmer G. Corwin
BY HIS ATTORNEYS

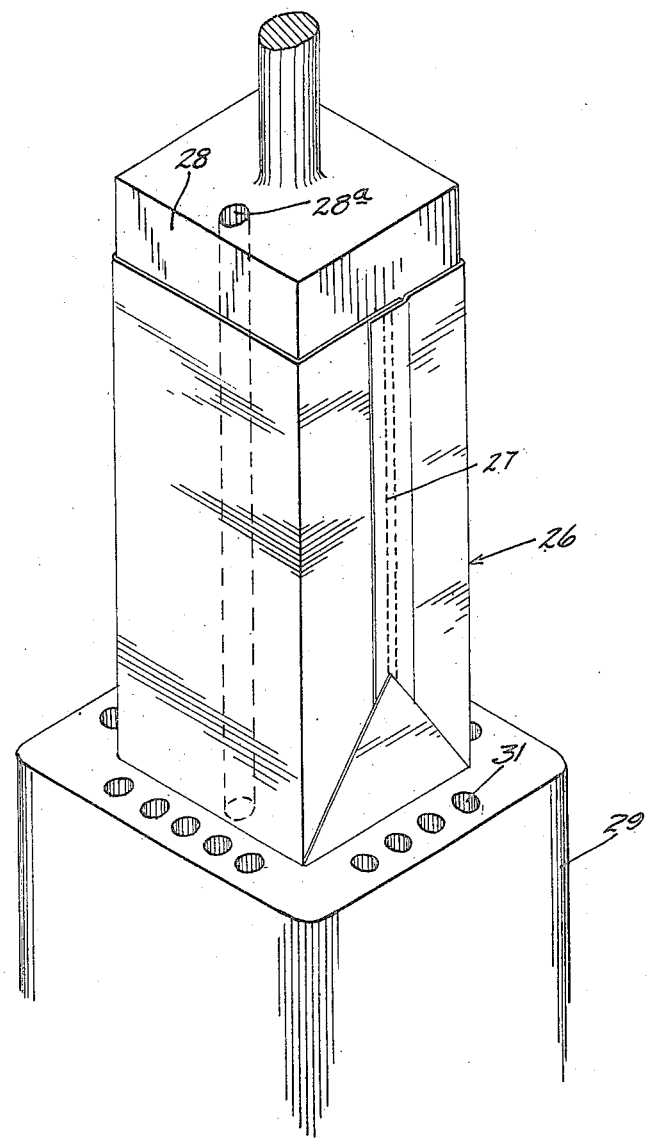

E. G. CORWIN.
PROCESS OF MAKING THERMAL BOXES.
APPLICATION FILED FEB. 21, 1917.
1,253,007.
Patented Jan. 8, 1918.
6 SHEETS—SHEET 5.
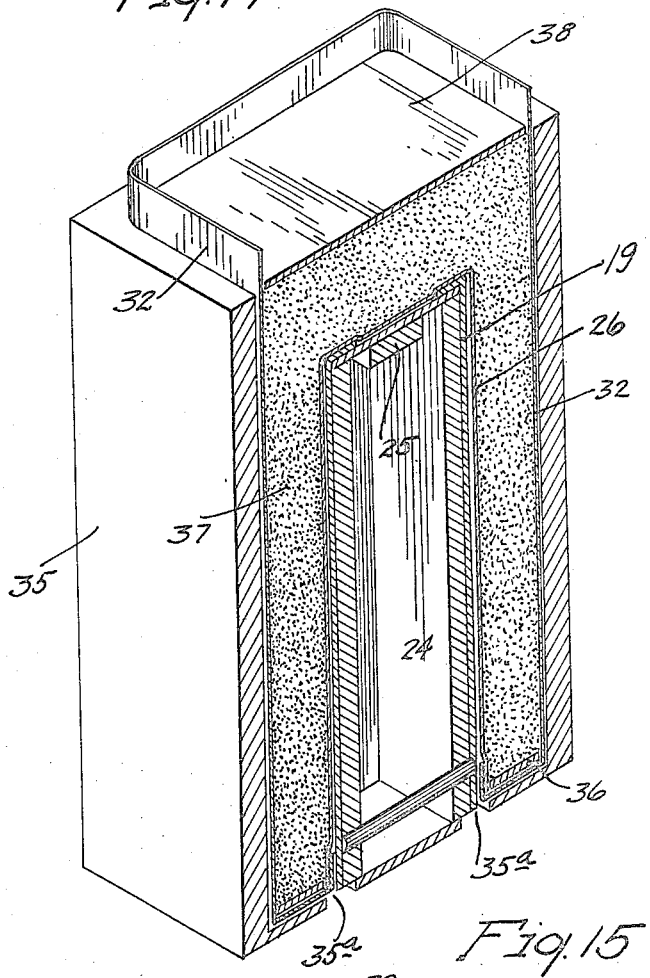
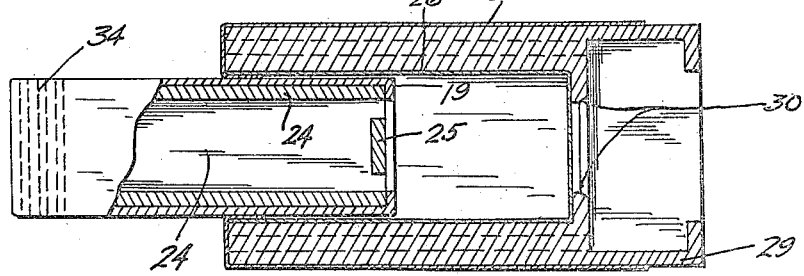
WITNESSES
E. C. Wells
H. L. Opsahl
INVENTOR
Elmer G. Corwin
BY HIS ATTORNEYS
Williamson Merchant

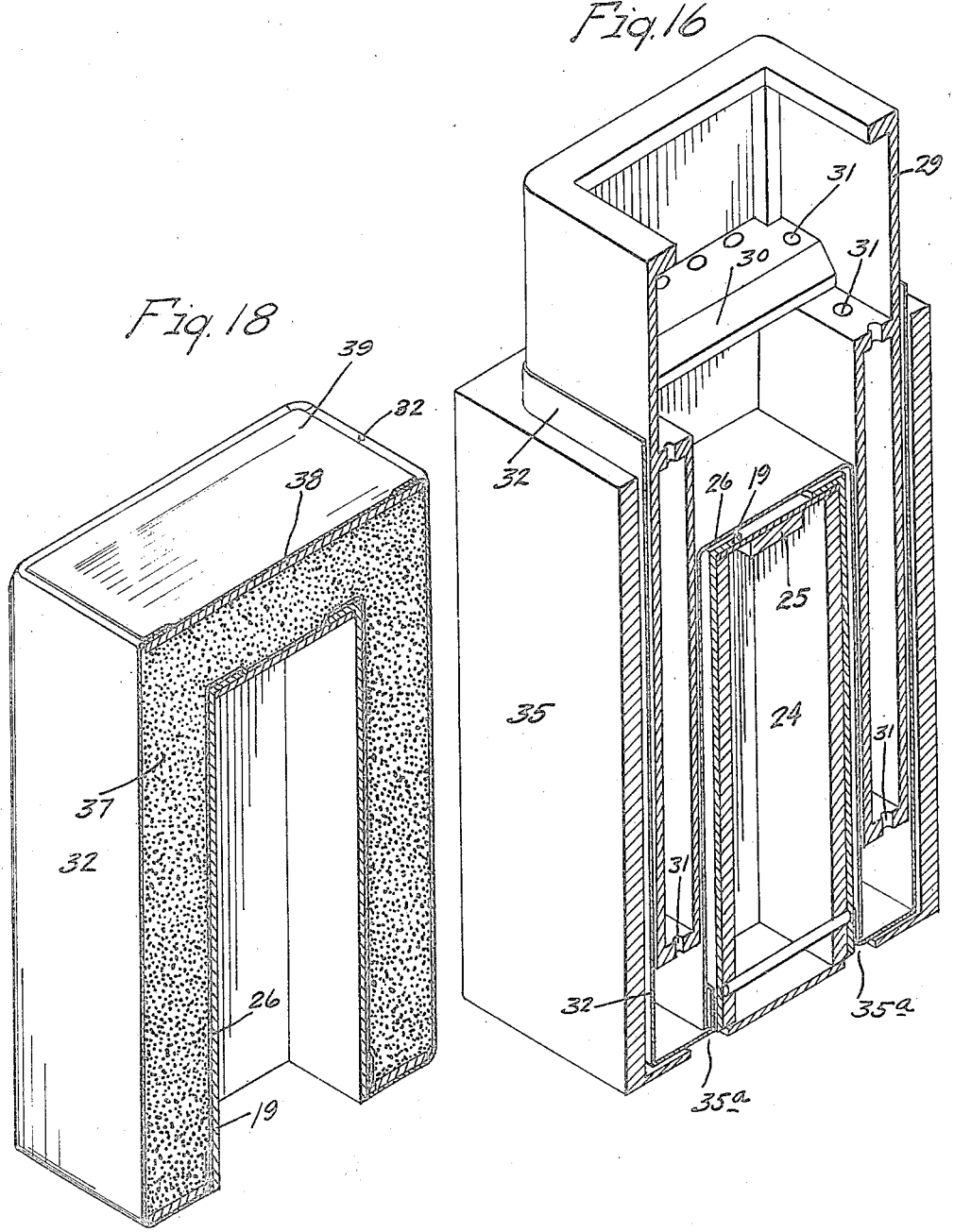

UNITED STATES PATENT OFFICE.

ELMER G. CORWIN, OF STILLWATER, MINNESOTA.

PROCESS OF MAKING THERMAL BOXES.

1,253,007.  Specification of Letters Patent.  Patented Jan. 8, 1918.

Application filed February 21, 1917. Serial No. 150,263.

*To all whom it may concern:*

Be it known that I, ELMER G. CORWIN, a citizen of the United States, residing at Stillwater, in the county of Washington and State of Minnesota, have invented certain new and useful Improvements in Processes and Apparatus for Making Thermal Boxes; and I do hereby declare the following to be a full, clear, and exact description of the invention, such as will enable others skilled in the art to which it appertains to make and use the same.

My invention has for its object to provide an improved process of an apparatus for making thermal boxes of the character disclosed and claimed in my prior United States Patent No. 1,121.072, of date, December 15, 1914, and entitled "Non-heat conducting receptacle"; and to such ends, generally stated, the invention consists of the novel devices, combinations of devices and steps of manipulation hereinafter described and defined in the claims.

Thermal boxes or non-heat conducting receptacles of the character disclosed in my said prior patent comprise an inner casing of stiff material, such as cardboard, a dust shield preferably of thin tough paper immediately surrounding the said inner casing, an external case of tough pliable paper or other material, and a heat insulating or non-conducting material packed between the said shield and exterior casing.

In practice I have found it very difficult to make boxes of the above character in true uniform shape and size at a sufficiently low cost to enable them to be commercially sold. However, I have accomplished these results by the provision of certain novel devices and the use thereof, in accordance with the process or manner of manipulation hereinafter explained.

The apparatus used for making the box in accordance with my improved process comprises four main elements, to-wit, two forming blocks, one for the inside casing and the other for a dust shield, a forming sleeve and packing box. All of these elements, when designed for making rectangular boxes, will be rectangular in cross section. The relation of these parts and the manner of using the same in accordance with the improved process, will be made clear in the following description.

In the drawings, which illustrate the invention, like characters indicate like parts throughout the several views.

Referring to the drawings:

Figure 1 is a view showing a cardboard blank for making the rectangular body of the inner casing;

Fig. 2 is a plan view of a blank for forming the bottom or inner end of the body of the inner casing;

Fig. 3 is a plan view of the flexible paper strip for making the dust shield;

Fig. 4 is a plan view of the tough flexible paper strip for making the outside casing of the box;

Fig. 5 is a plan view showing a rectangular stiffening collar, preferably of cardboard, and which is used in construction of the box;

Fig. 6 is a plan view of a stiff or so-called "bottom card" used in the construction of the box;

Fig. 7 is a plan view of a so-called sealing strip for application to the finished bottom of the box;

Fig. 8 is a perspective view of the forming block for the inside casing;

Fig. 9 is a section taken on the line 9—9 of Fig. 8;

Fig. 10 is a perspective view of the forming sleeve;

Fig. 11 is a section taken on the line 11—11 of Fig. 10;

Fig. 12 is a perspective view showing the inside casing formed around its forming block;

Fig. 13 is a perspective view showing the dust shield formed around its forming block and partly inserted into the forming sleeve;

Fig. 14 is a perspective view showing the outer casing formed around the forming sleeve, and also showing the dust shield inserted into the said forming sleeve;

Fig. 15 is a section taken longitudinally of the forming sleeve and forming block in the inside casing, showing the latter partly inserted into the former, and the said inner casing partly inserted into the said dust shield;

Fig. 16 is a sectional perspective showing the packing box, forming sleeve and forming block in the inner casing telescoped together, the sleeve being partly withdrawn and illustrating one of the important steps in the use of the apparatus in carrying out the process;

Fig. 17 is a fragmentary perspective illustrating one of the final steps in the use of the apparatus for carrying out the process and Fig. 18 shows the completed product, to-wit, the completed box, after the same has been stuffed and finished.

The cardboard blank from which the body of the inside casing is formed, is indicated, as an entirety, by the numeral 19. This blank is scored or creased at 20, is provided at its ends with four projecting lips to which lines of glue or adhesive material 21 are applied. At one end, the blank 19 is provided with a sealing flap to which a line of glue or adhesive 22 is applied. (See Fig. 1). The numeral 23 indicates the cardboard blank for forming the bottom or inner end plate of the inside casing.

The inside casing is formed by wrapping the blank 19 around the rectangular forming plunger 24, best shown in Figs. 8 and 9. For an important reason, this forming block has a large air passage therethrough, which at one end, is shown as partly closed by a bridge flange 25. The blank 19, of course, is wrapped around the forming plunger 24 with its scored lines or creases 20, at the projecting angles of said block and with the sealing lips projecting beyond the end thereof. The gummed flap 22 overlaps with and is stuck to the opposite end of the formed blank. The end blank 23 is then placed against that end of the forming block 24 and the adhesive surfaces 21 of the sealing flaps are then bent down and stuck to the said blank 23. This completes the formation of the relatively stiff inside casing.

The flexible strip 26 (see Fig. 3) for forming the dust shield, is provided with adhesive lines 27. The dust shield is formed from this strip 26 by folding it around the forming block 28, (see Fig. 13), and this is preferably done by placing the end of the said block against the back of the central portion of the said strip and then folding the said strip around the sides of the box and uniting the overlapped edges by the glue lines 27. Thus the said dust shield is given its rectangular form and is made of such size that the inside casing may be slipped into the same. Furthermore, the dust shield thus formed on the block 28 is of such size that it, together with the said block, may be telescoped into the rectangular forming sleeve 29. In Fig. 13, the said block and shield are partly inserted into the said forming sleeve.

The forming sleeve 29 is considerably longer than the dust shield and is provided at the inner extremity of the block therein made, to receive the said shield, with a perforated stop plate 30 and beyond the said stop plate is made hollow. Furthermore, for an important reason, the walls of the forming sleeve 29 are provided with longitudinal air passages 31.

The above described operations of forming the inside casing and dust shield may be performed simultaneously, or either thereof, may be in advance of the other.

By means of the forming block 28, the dust shield will be inserted into the forming sleeve 29 and the said block may then be withdrawn, leaving the said shield within the said sleeve. The block 28 is provided with longitudinal air passages 28ª to prevent the same from pulling the shield out of the sleeve by suction.

The next step in the operation is to form the outside shield by wrapping the tough paper strip 32 (Fig. 4) around the exterior of the forming sleeve 29 with one edge thereof projecting far enough to form the sealing flaps 32ª shown in Fig. 14, by reference to which, it will be seen that the said sealing flaps project toward and overlap the open end of the dust shield 26. The overlapped longitudinal edges of the said strip 32 are stuck together by the glue line 33 which is formed across one end of the said strip.

The next step of the operation is to force the formed inside casing into the dust shield, and this is done while it is still on its forming block 24. Before this inner casing is forced into the shield, however, it is preferably provided on the outer four sides of its outer end portion with glue lines 34. (See Fig. 15).

When the inside casing is, by means of the block 24, forced into the dust shield, as stated, and as shown in Fig. 15, it will turn the flaps 32 of the outside casing inward, and when the said inside casing has reached its final position, the glue lines 34 will be pressed against the inturned flaps and firmly stick the said elements together.

The next step in the operation is to place all of the parts assembled, as just described, into the packing box 35, as shown in Fig. 16, wherein, however, the sleeve 29 is shown as partly withdrawn. The complete withdrawal of the said forming sleeve 29 is the next step of the operation. After this forming sleeve 29 has been removed and while the forming block 24 is still in position, the rectangular cardboard stiffening collar 36 shown in Fig. 5 is forced around the dust shield and to the bottom of the space between the same and the outside casing. Or, in other words, to the position shown in Fig. 17.

After the forming sleeve 29 has been withdrawn but while the block 24 is still in position, the space between the dust shield and outside casing is packed with finely divided heat insulating material 37. As a suitable heat insulating material for this purpose, finely divided cork, or any of a large number of materials may be used. This material is packed to a point above the inverted bottom of the dust shield, substantially as shown in Fig. 17, and then the cardboard bottom card 38 shown in Fig. 6, is inserted, as shown in Fig. 17, and thereafter, the projecting upper end edge of the outside casing 32 is folded over onto the said bottom card and finally the box is completed by applying the adhesive face of the sealing sheet 39 shown in Fig. 7, to the said card and to the inturned edges of the said strip 32. This completes the construction of the body of the box and the same may then be forced out of the packing box 35 in any suitable way, as by pressing the finger, for example, through openings 35a formed in the bottom of the said packing box. Then, and finally, the forming block 24 may be withdrawn from the completed box, leaving the latter in the form shown in Fig. 18. The box thus formed is complete except for a cover. This cover, however, is the subject matter of another application, but this cover has nothing to do with the present invention.

What I claim is:

1. The process of making thermal boxes which consists in forming a relatively stiff inside casing, with one closed end and one open end; in forming a dust shield of a size to fit over said inside casing; in forming a relatively large outer casing and in applying the same around said shield spaced therefrom; in thereafter inserting said inside casing into said shield and in closing the end of the space between said shield and outside casing, at the open end of said inside casing; in filling the space between said shield and outside casing with a heat insulating material; and in finally applying a bottom forming blank to the open end of said outside casing and in sealing the same.

2. The process of making thermal boxes which consists in forming a relatively stiff inside casing, with one closed end and one open end; in forming a dust shield of a size to fit over said inside casing; in forming a relatively large outer casing and in applying the same around said shield spaced therefrom; in thereafter inserting said inside casing into said shield and in closing the open end of said inside casing; in filling the space between said shield and outside casing with a heat insulating material; and in finally applying a bottom forming blank to the open end of said outside casing and in sealing the same; the steps above noted including also the application of adhesive material to the said elements, whereby the edges and engaging portions are primarily stuck together.

3. The process of making thermal boxes which consists in forming, from cardboard blanks, the walls and one end of a relatively stiff inside casing; in forming from a pliable paper blank, a dust shield of a size to fit over said inside casing; in forming a relatively large outer casing and in applying the same around said shield, spaced therefrom; in folding inward one end of said outside casing, to close the space between the same and said shield; in next forcing said inside casing into said shield; in thereafter filling the space between said shield and outside casing with a heat insulating material; and finally in applying a bottom forming blank to the open end of said outside casing and sealing the said end.

4. The process of making thermal boxes which consists in forming, from cardboard blanks, the walls and one end of a relatively stiff inside casing; in forming from a pliable paper blank, a dust shield of a size to fit over said inside casing; in forming a relatively large outer casing and in applying the same around said shield, spaced therefrom; in folding inward one end of said outside casing, to close the space between the same and said shield; in next forcing said inside casing into said shield; in thereafter filling the space between said shield and outside casing with a heat insulating material; and finally in applying a bottom forming blank to the open end of said outside casing and sealing the said end; the steps above including also the application of adhesive material, whereby the engaged edge portions of said blanks are permanently stuck together.

5. The process of making thermal boxes which consists in forming a relatively stiff inside casing around a forming block; in forming an outside casing around a forming sleeve, and bending one end thereof over one end of said sleeve; in forcing said inside casing and forming block into said forming sleeve and positioning said inside casing with its open end at the inturned end of said outside casing; then removing said forming sleeve from between said casings while leaving said forming block in position; and then filling the space between said casings with a heat insulating material; in closing and sealing the end of said outside casing to complete the box; and finally withdrawing said forming block from said inner casing.

6. The process of making thermal boxes which consists; in forming a relatively stiff inside casing around a forming block; in forming a dust shield over a forming plunger; in inserting said dust shield and plunger into a forming sleeve, in removing said plunger from said shield, leaving the shield within said sleeve; in forming an outside casing around said forming sleeve and in bending one end thereof over one end of said forming sleeve, so that its edge projects inward of the inner wall thereof; in forcing said inside casing into said shield and in turning inward the inwardly projecting edges of said outside casing, by the use of said forming block; in removing said forming sleeve, while leaving said forming block positioned within said inside casing; in filling the space between said shield and outside casing with a heat insulating material; in applying a bottom forming end blank to the open end of said outside casing and in sealing said end; and finally withdrawing said forming block from said inner casing.

7. The process of making thermal boxes which consists; in forming, from two cardboard blanks, the walls and one end of a relatively stiff inside casing, around a forming block; in forming, from a single blank, the wall and one end of a dust shield, over a forming plunger; in inserting said dust shield and plunger into a forming sleeve; in removing said plunger from said shield, leaving said shield within said forming sleeve; in forming an outside casing around said forming sleeve, with one end projecting beyond one end of said sleeve and in bending the said projecting end inward over the adjacent end of said sleeve, so that its edge projecting inward of the inner wall thereof; in forcing said inside casing into said shield and in turning inward the inwardly projecting edge of said outside casing, by the use of said forming block; in removing said forming sleeve, while leaving said forming block positioned within said inside casing; in placing a stiffening collar in the space between said shield and outside casing and against the inturned end of the latter; in filling the space between said shield and outside casing, with a heat insulating material; in applying a bottom forming blank to the open end of said outside casing and in sealing said end; and in finally withdrawing said forming block from said inner casing of the box thus formed.

In testimony whereof I affix my signature in presence of two witnesses.

ELMER G. CORWIN.

Witnesses:
CLARA DEMAREST,
MAY A. SMITH.

Copies of this patent may be obtained for five cents each, by addressing the "Commissioner of Patents, Washington, D. C."